United States Patent [19]

Weaver et al.

[11] Patent Number: 4,803,241
[45] Date of Patent: Feb. 7, 1989

[54] CONDENSATION POLYMERS CONTAINING STYRYLBENZAZOLE ULTRAVIOLET RADIATION-ABSORBING RESIDUES AND SHAPED ARTICLES PRODUCED THEREFROM

[75] Inventors: Max A. Weaver; Wayne P. Pruett, both of Kingsport; Samuel D. Hilbert, Jonesborough; Robert D. Burpitt, Kingsport, all of Tenn.

[73] Assignee: Eastman Kodak Company, Rochester, N.Y.

[21] Appl. No.: 75,374

[22] Filed: Jul. 20, 1987

[51] Int. Cl.$^4$ ................................. C08K 5/35
[52] U.S. Cl. ..................... 524/719; 524/714; 524/720; 524/721; 524/724; 524/729; 525/165; 525/279; 525/293; 528/289; 528/290; 528/295
[58] Field of Search ............... 524/719, 720, 721, 724, 524/714, 729; 525/165, 279, 293; 528/289, 290, 295

[56] References Cited

U.S. PATENT DOCUMENTS 3,912,697 10/1974 Pacifici .................... 525/56
4,167,628 9/1979 Kormany .................. 542/454

*Primary Examiner*—Maurice J. Welsh
*Assistant Examiner*—S. A. Acquah
*Attorney, Agent, or Firm*—J. Frederick Thomsen; William P. Heath, Jr.

[57] ABSTRACT

A composition useful for molding into articles such as food containers, soft drink bottles, cured structural plastics and the like, comprising molding grade linear or unsaturated polyester or polycarbonate having reacted or copolymerized therein the residue of one or a mixture of styrylbenzazole reactants of the formula:

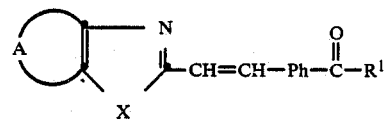

wherein A is the residue of a benzene ring of a benzoxazole, benzothiazole or benzionidazole radical; X is —O—, —S— or —N($R^2$)—; Ph is a phenylene radical; and $R^1$ is halogen or —Y—$R^2$ in which Y is —O— or —N($R^2$)— and each $R^2$ is hydrogen, alkenyl or an unsubstituted or substituted alkyl, cycloalkyl or aryl radical.

9 Claims, No Drawings

CONDENSATION POLYMERS CONTAINING STYRYLBENZAZOLE ULTRAVIOLET RADIATION-ABSORBING RESIDUES AND SHAPED ARTICLES PRODUCED THEREFROM

DESCRIPTION

This invention concerns condensation polymers, including linear, thermoplastic polyesters, unsaturated polyesters and polycarbonates, wherein the polymer contains, as an integral part of the polymer backbone or chain, certain ultraviolet (UV) light absorbing residues derived from certain styrylbenzazole compounds which are reacted with the polymer or polymer precursors, i.e., prepolymer or monomers.

Many products such as certain fruit juices, soft drinks, wines, food products, cosmetics and shampoos are deleteriously affected, i.e., degraded, by ultraviolet (UV) light when packaged in clear plastic containers which pass significant portions of the available light at wavelengths in the range of approximately 250 to 390 nm. It is well known that polymers can be rendered resistant to degradation by UV light by physically blending in such polymers various UV light stabilizers such as benzophenones, benzotriazoles and resorcinol monobenzoates. See, for example, Plastics Additives Handbook, Hanser Publishers, Library of Congress, Catalog No. 83-062289, pp 128-134. Normally, such stabilizers are used in a weight concentration of at least 0.5 percent. Although these stabilizers function well to absorb radiation in the range of about 300 to 350 nm, absorbance in the range of 300 to 350 nm is not adequate to protect comestibles subject to UV light degradation packaged in clear plastic, i.e., essentially colorless, transparent plastic. The stabilizers in the known stabilized polymer compositions can be extracted from the polymer by solvents such as acids, alcohols and the like present in foods or beverages packaged within the stabilized polymers. Furthermore, many compounds used to stabilize polymers are not stable at high temperatures and decompose under the conditions at which polyesters are manufactured or processed. Decomposition of such stabilizers frequently causes yellow discoloration of the polyester and results in the polyester containing little, if any, of the stabilizer.

U.S. Pat. No. 3,159,646 discloses certain 2-(2-hydroxy)benzotriazoles which contain one or more pendant, ethylenically-unsaturated groups which enables the 2-(2-hydroxy)benzotriazoles to be reacted into or copolymerized with ethylenically-unsaturated monomers such as styrene, stylene-acrylonitrile, butyl methacrylate and unsaturated polyesters. U.S. Pat. No. 1,159,646 does not disclose styrylbenzazole compounds capable of absorbing UV radiation nor does it disclose UV absorbers which can be reacted with ester-forming monomers used in the preparation of polyesters.

U.S. Pat. Nos. 4,338,247, 4,305,719, 4,340,718 and 4,617,374 disclose polyesters having certain methine compounds reacted therein to absorb light in the range of 320 to 380 nm. That patent, however, does not disclose the styrylbenzazole compounds used in the polyester compositions and articles molded therefrom provided by our invention.

Our invention concerns a composition comprising molding grade condensation polymer having copolymerized therein the residue of a styrylbenzazole compound or mixture of styrylbenzazole compounds having the formula:

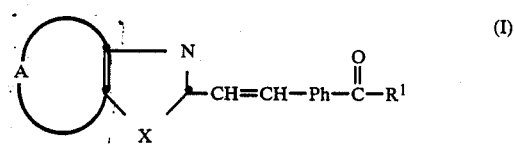

wherein

A is the residue of a benzene ring of a benzoxazole, benzothiazole or benzimidazole radical;

X is $-O-$, $-S-$ or $-N(R^2)-$ wherein $R^2$ is defined below;

pH is a phenylene radical; and $R^1$ is halogen or a group represented by $-Y-R^2$ wherein Y is $-O-$ or $-N(R^2)$; and each R is hydrogen, alkenyl, or an unsubstituted or substituted alkyl, cycloalkyl or aryl radical; provided the styrylbenzazole compounds bear at least one substituent which is reactive with the polymer or polymer precursors, e.g., prepolymer or one of the monomers from which the polymer is derived, the styrylbenzazole residue absorbing radiation in the range of from about 250 to 390 nm, and being nonextractable from the polymer and stable under polymer processing conditions.

We have found that polyesters and polycarbonates containing the residue of one or more of the styrylbenzazole compounds described hereinabove can be used in the manufacture of containers and other shaped articles and that such containers and articles absorb harmful radiation of the wavelength referred to above. Thus, UV light degradation of materials packaged in the containers and articles is reduced or eliminated. When used in low concentrations, e.g., 200 to 800 ppm, the styrylbenzazole residues derived from the styrylbenzazoles compounds described below impart to the polymers the property of UV or visible light absorption within the range of from about 250 nm to about 390 nm. The styrylbenzazole compounds react with the polymer chain or backbone, for example, through an ester group of the styrylbenzazole compounds. The styrylbenzazole compounds and residues are thermally stable at polymer processing conditions, which includes polycondensation temperatures of up to about 300° C. which are used, for example, in the preparation of polyesters such as poly(ethylene terephthalate), copolymers of terephthalic acid, ethylene glycol, 1,4-cyclohexanedimethanol and poly(ethylene 2,6-naphthalene dicarboxylate).

The concentration of the residue of the styrylbenzazole compound in the condensation polymer can be varied substantially depending, for example, on the intended function of the UV-absorbing residue and/or the end use for which the polymer composition is intended. When the polymer composition is to be used in the fabrication of relatively thin-walled containers to screen UV light in the range of about 250 to 390 nm, the concentration of the residue of the styrylbenzazole compound normally will be in the range of about 50 to 1500 ppm (parts by weight per million parts by weight polymer) with the range of about 200 to 800 ppm being especially preferred.

The concentration of the styrylbenzozole moieties may be increased to higher levels such as 5,000 ppm (0.5 weight percent) or higher, to provide polymers which exhibit improved resistance to weathering. Furthermore, when these polymer compositions per se or fibers thereof are dyed with disperse dyes at a concentration, for example, of from about 0.01 to about 5.0% based on weight of polymer or fiber, the dyed polymer or fibers may exhibit increased lightfastness. Such disperse dyes are shown, for example, in U.S. Pat. Nos. 4,305,719; 2,746,952; 2,746,953; 2,757,173; 2,763,668; 2,771,466; 2,773,054; 2,777,863; 2,785,157; 2,790,791; 2,798,081; 2,805,218; 2,822,359; 2,827,450; 2,832,761; 2,852,504; 2,857,371; 2,865,909; 2,871,231; 3,072,683; 3,079,373; 3,079,375; 3,087,773; 3,096,318; 3,096,322; 3,236,843; 3,254,073; 3,349,075; 3,380,990; 3,386,990; 3,394,144; 3,804,823; 3,816,388; 3,816,392; 3,829,410; 3,917,604; 3,928,311; 3,980,626; 3,998,801; 4,039,522; 4,052,379; and 4,140,683, the disclosures of which are incorporated herein by reference.

Polymer compositions containing substantially higher amounts, e.g., from about 2.0 to 10.0 weight percent, of the residue of one or more of the styrylbenzazole compounds described herein may be used as polymer concentrates. Such concentrates may be blended with the same or different polymer according to conventional procedures to obtain polymer compositions which will contain a predetermined amount of the residue or residues in a non-extractable form. In the preparation of these highly loaded, polymer composition concentrates the residue preferably is divalent and thus is derived from a difunctional styrylbenzazole compound such as the compound having the formula

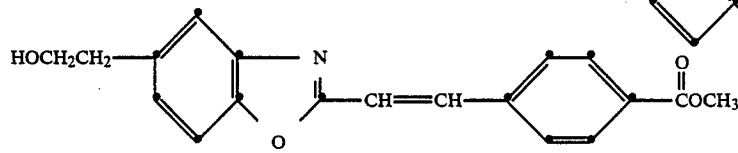

The residue represented by A can be unsubstituted, e.g., butadienediyl (—CH=CHCH=CH—), or substituted with one or more groups such as alkyl, cycloalkyl, aryl, alkoxy, cycloalkoxy, aryloxy, alkylthio, alkoxycarbonyl, halogen, amino, alkanoylamino, cycloalkanoylamino, aroylamino, alkylsulfonamido, cycloalkylsulfonamido, arylsuflonamido and the like. The alkyl substituents and the alkyl moieties of the alkoxy, alkylthio, alkanoylamino and alkylsulfonamido substituents similarly may be substituted, for example, with hydroxy, alkoxy, hydroxyalkoxy, alkanoyloxy, aryl, aryloxy, carboxy, alkoxycarbonyl, cycloalkyl, cycloalkoxy, etc. The cycloalkyl and aryl moieties of the cycloalkoxy, aryloxy, cycloalkanoylamino, aroylamino, cycloalkylanlfonamido and arylsulfonamide may be substituted with alkyl as well as the substituents set forth above. The amino groups may be substituted with alkyl, cycloalkyl or aryl.

The phenylene radical represented by Ph may be unsubstituted phenylene or phenylene substituted for example with alkyl, alkoxy or halogen. Each $R^2$ group present on the compounds of formula (I) is selected from hydrogen, alkenyl, or an unsubstituted or substituted alkyl, cycloalkyl or aryl radical. Examples of the substituents which may be present on the substituted alkyl, cycloalkyl and aryl groups represented by each $R^2$ are set forth above.

Normally the unsubstituted and substituted groups set forth hereinabove in the definitions of A, Ph, and $R^2$ may contain up to about 12 carbon atoms. Preferably, the alkyl groups and the alkyl moiety of the groups set forth will be lower alkyl, i.e., alkyl or up to about 4 carbon atoms. The aryl radicals typically are phenyl and phenyl substituted with lower alkyl, lower alkoxy or halogen.

The styrylbenzazole residue present in the polymer composition provided by our invention preferably have the structure:

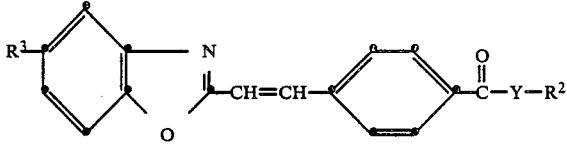

wherein $R^3$ is hydrogen or an optionally substituted alkyl, cycloalkyl, aryl, alkoxy, alkoxycarbonyl, halogen, alkanoylamino, aroylamino, alkylsulfonylamido or arylsulfonamido radical;

X is —O—, —S— or —N($R^2$)—; and

Y is —O— or —N($R^2$)—; and $R^2$ is hydrogen or an optionally substituted alkyl, cycloalkyl, or aryl radical.

The compounds of formula (I) which are preferred have the formula:

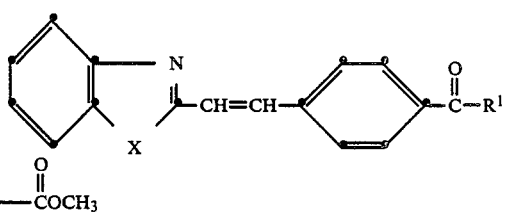

wherein

X is —O—, —S—, or —NH—; and $R^1$ is hydroxy, alkoxy, hydroxyalkylamino or di(hydroxyalkyl)amino.

As specified hereinabove, the compounds of formula (I) must bear or contain at least one substituent which is reactive with the polymer or polymer precursor such as a prepolymer or one of the monomers. Examples of such substituents include carboxy, alkoxycarbonyl, cycloalkoxycarbonyl, aryloxycarbonyl, alkenyloxycarbonyl, halocarbonyl, hydroxy, alkanoyloxy, carbamoyloxy, substituted carbamoyloxy such as N-alkylcarbamoyloxy, N,N-dialkylcarbamoyloxy and N-arylcarbamoyloxy. When only one reactive group is present, the residue of the compound of formula (I) will be present in the polymer as a chain terminating group whereas if two reactive groups are present the residue of compound (I) may be present within the polymer chain.

The styrylbenzazole compounds can be prepared using known procedures by reacting a 2-methylbenzazole compound with a benzaldehyde compound, usually under acid conditions:

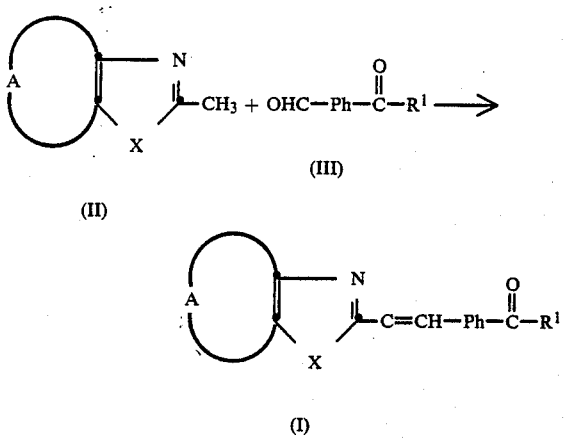

(II)

(III)

(I)

See, for example, the procedures described in U.S. Pat. No. 3,274,184. The styrylbenzazoles (I) can be utilized without further reaction or they can be converted into a variety of useful compounds. The 2-methylbenzazoles usually are prepared by reacting an o-aminophenol, o-aminobenzenethiol or o-phenylenediamine with acetic anhydride.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (IV) of about 0.4 to about 1.2.

The preferred polyesters comprise at least about 50 mole percent terephthalic or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalic or 2,6-naphthalenedicarboxylic acid residues and from about 75 to 100 mole percent ethylene glycol residues.

The unsaturated, curable polyesters which may be used in our novel compositions are the polyesterification products of one or more glycols and one or more unsaturated dicarboxylic acids or their anhydrides. Typical of the unsaturated polyesters is the polyesterification product of (a) 1,4-cyclohexanedimethanol and-/or 2,2-dimethyl-1,3-propanediol and optionally an additional dihydric alcohol, such as ethylene glycol, and (b) maleic acid or fumaric acid and an aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

Solutions of such unsaturated polyester resins in an ethylenically-unsaturated monomer such as styrene commonly are referred to as polyester resins.

The unsaturated polyester resins may be prepared in the presence of gelation inhibitors such as hydroquinone or the like, which are well known in the art of polyesterification. The esterification may be carried out for example under an inert blanket of gas such as nitrogen in a temperature range of 118°-220° C. for a period of about 6-20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, isophthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mole percent propylene glycol, and as the acid component, from about 75 to 100 mole percent o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

Typical polycarbonates useful herein are disclosed in Kirk-Othmer Encyclopedia of Chemical Technology, third edition, Volume 18, pages 479–494, incorporated herein by reference.

The novel polymer compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate) and poly(ethylene terephthalate) wherein up to 5 mole percent of the ethylene glycol residues have been replaced with residues derived from 1,4-cyclohexanedimethanol, wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a Carbon Dioxide Permeability of 20–30 cc. mils/100 in.$^2$-24 hrs.-atm., and an Oxygen Permeability of 4–8 cc. mils/100 in.$^2$-24 hrs.-atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minn., and the Carbon Dioxide Permeability by the standard operating procedure of a MOCON PERMATRAN C II, also of Modern Controls.

The preparation of the styrylbenzazole compound and their use in preparing the compositions of our invention are further illustrated by the following examples.

EXAMPLE 1

A mixture of 2,5,6-trimethylbenzoxazole (8.0 g, 0.05 m), methyl 4-formylbenzoate (9.0 g, 0.055 m), N-methylpyrrolidione (5 mL), p-toluenesulfonic acid (5.4 g, 0.028 mol), and xylene (85 mL) is heated at reflux under a Dean-Stark trap for four hours. The reaction mixture is allowed to cool and methanol (100 mL) is added. After being cooled in an ice-batch to 0°-5° C., the mixture is filtered. The product, methyl 4-[2,(5,6-dimethyl-2-benzoxazolyl)vinyl]benzoate, is collected by filtration, washed with a little cold methanol, and dried in air (yield 9.0 g, 59% of the theoretical yield, m.p. 202°-3° C.). When dissolved in methylene chloride the product has an absorption maximum at about 355 nm.

EXAMPLE 2

A mixture of 3.0 g methyl 4-[(5,6-dimethyl-2-benzoxazolyl)vinyl]benzoate, 25 mL of acetic acid, 9.0 mL of concentrated sulfuric acid, and 7 mL of water is stirred and refluxed for three hours. The mixture is cooled and added to water. The product is collected by filtration, washed with water and air dried. The crude product is recrystallized from N,N-dimethylformamide to give 2.57 g of 4-[2-(5,6-dimethyl-2-benzoxazolyl)vinyl]benzoic acid, which melts at >300° C.

EXAMPLE 3

A mixture of 1.0 g (0.0034 m) of 4-[2,(5,6-dimethyl-2-benzoxazolyl)vinyl]benzoic acid, sodium carbonate (1.0 g), and thionyl chloride (6.0 mL) is stirred at room temperature for 2 days, during which time the acid dissolves. The carbonate is removed by filtration and the filtrate is added to ether to precipitate the product, which is collected by filtration and dried in a vacuum dessicator. The yield is 0.75 g of 4-[2-(5,6-dimethyl-2-benzoxazolyl)vinyl]benzoyl chloride which melts at 216°-217° C.

The acid chloride from Example 3 can be reacted with a variety of alcohols and amines to produce compounds of structure (I). Typical amines include ethanolamine, diethanolamine, 3-amino-1-propanol, 3-amino-1,2-propanediol, 2-amino-2-methyl-1-propanol, (2-(ethylamino)ethanol, 2-anilinoethanol, 4-aminomethylcyclohexanemethanol, ethyl 3-aminobenzoate, 4-aminobenzoic acid, 4-aminophenylethanol, 3-aminobenzylalcohol, 4-aminophenoxyethanol, β-alanine, glycine, 6-aminohexanoic acid, 4-aminophenylacetic acid, 4-aminophenoxyacetic acid, etc.

EXAMPLE 4

A mixture of 2-methylbenzothiazole (7.4 g, 0.05 m), methyl 4-formylbenzoate (9.0 g, 0.055 m), N-methylpyrrolidione (10 mL), p-toluenesulfonic acid (10 g), and xylene (85 mL) is heated at reflux and the water removed azeotropically using a Dean-Stark trap for four hours. After being allowed to cool the reaction mixture is diluted with methanol to precipitate the product, methyl 4-[2-(2-benzothiazolyl)vinyl]benzoate, (yield 10.0 g). Recrystallization from methanol gives a light colored fluorescent product which melts at 168°-169° C.

EXAMPLE 5

A mixture of 2-methylbenzimidazole (92.4 g, 0.70 m), methyl 4-formylbenzoate (14.7 g, 0.90 m) and acetic anhydride (190 mL) is refluxed for 7.0 hours and allowed to cool. Benzene is added and the reaction mixture stirred for one hour. The product is collected by filtration, washed with benzene, and finally with petroleum ether, and air dried. The yield is 117 g, 60% of the theoretical yield, of methyl 4-[2-(2-benzimidazolyl)vinyl]benzoate which melts at 210°-213° C. in the crude state. When dissolved in methylene chloride, the product has an absorption maximum (λ max) at 348 nm.

Additional examples of styrylbenzazole compounds which may be used to prepare our novel polymer compositions are set forth in the following table. These compounds may be prepared according to the procedures described hereinabove and conform to the formula:

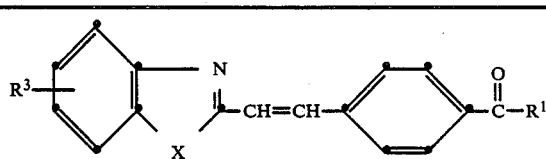

| Ex. | $R^3$ | X | $R^1$ |
| --- | --- | --- | --- |
| 6 | H | —O— | —OH |

-continued

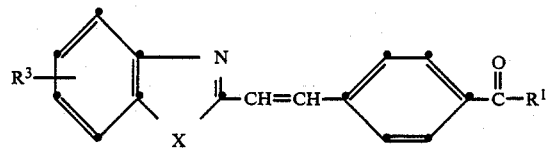

| Ex. | $R^3$ | X | $R^1$ |
|---|---|---|---|
| 7 | H | —O— | —OCH$_3$ |
| 8 | H | —O— | Cl |
| 9 | H | —O— | —OCH$_2$CH$_2$OH |
| 10 | H | —O— | —O(CH$_2$CH$_2$O)$_2$H |
| 11 | H | —O— | —OCH$_2$CH$_2$OC$_2$H$_5$ |
| 12 | 5-OCH$_3$ | —O— | —OCH$_3$ |
| 13 | 5-C$_6$H$_5$ | —O— | —OH |
| 14 | 5-C$_6$H$_{11}$ | —O— | —OCH$_3$ |
| 15 | 5-CH$_2$CH$_2$OH | —O— | —OCH$_2$CH$_2$CN |
| 16 | 5-OCH$_2$CH$_2$OH | —O— | —OCH$_2$CH$_2$Cl |
| 17 | 5,6-di-CH$_3$ | —O— | —OH |
| 18 | 5,6-di-CH$_3$ | —O— | —OCH$_2$C$_6$H$_5$ |
| 19 | 5,6-di-CH$_3$ | —O— | —OCH$_2$OC$_6$H$_5$ |
| 20 | 5,6-di-CH$_3$ | —O— | —OCH$_2$CH$_2$SCH$_2$CH$_2$OH |
| 21 | 5,6-di-CH$_3$ | —O— | —OCH$_2$CH$_2$OOCCH$_3$ |
| 22 | 6-NH$_2$ | —O— | —OH |
| 23 | 6-NHCOCH$_3$ | —O— | —OCH$_3$ |
| 24 | 6-NHCOC$_6$H$_5$ | —O— | —OCH(CH$_3$)$_2$ |
| 25 | 6-NHCOCH$_2$OH | —O— | —(CH$_2$)$_3$CH$_3$ |
| 26 | 6-NHCONHC$_6$H$_5$ | —O— | —OCH$_2$C$_6$H$_{11}$ |
| 27 | 6-NHCOC$_6$H$_4$—4-COOCH$_3$ | —O— | —OC$_6$H$_{11}$ |
| 28 | 5-NHCOC$_6$H$_5$ | —O— | —OCH$_3$ |
| 29 | 5-NHSO$_2$C$_6$H$_5$ | —O— | —OCH$_3$ |
| 30 | 5,6-di-OCH$_2$CH$_2$OH | —O— | —OC$_6$H$_{11}$ |
| 31 | 5,6-di-Cl | —O— | —OC$_6$H$_5$ |
| 32 | 5-Br | —O— | —OCH$_2$C̄—CHCH═CHO |
| 33 | 5-Cl-6-CH$_3$ | —O— | —OCH$_2$C$_6$H$_{10}$—4-CH$_2$OH |
| 34 | 5,7-di-CH$_3$ | —O— | —OCH$_2$CH$_2$OOCOC$_2$H$_5$ |
| 35 | 5,6-di-CH$_3$ | —O— | —NHOCH$_2$CH$_2$OH |
| 36 | 5,6-di-CH$_3$ | —O— | —N(CH$_2$CH$_2$OH)$_2$ |
| 37 | 5,6-di-CH$_3$ | —O— | —N(CH$_3$)CH$_2$CH$_2$OOCCH$_3$ |
| 38 | 5,6-di-CH$_3$ | —O— | —N(C$_6$H$_5$)CH$_2$CH$_2$OH |
| 39 | 5,6-di-CH$_3$ | —O— | —N(C$_6$H$_{11}$)CH$_2$CH(OH)CH$_2$OH |
| 40 | 5,6-di-CH$_3$ | —O— | —N(CH$_2$CH$_2$OOCCH$_3$)$_2$ |
| 41 | 5,6-di-CH$_3$ | —O— | —NHCH$_2$COOH |
| 42 | 5,6-di-CH$_3$ | —O— | —NHCH$_2$CH$_2$COOC$_2$H$_5$ |
| 43 | 4,5,6-tri-CH$_3$ | —O— | —NHCH$_2$C$_6$H$_{10}$—4-CH$_2$OH |
| 44 | 4,5,6-tri-CH$_3$ | —O— | —NHC$_6$H$_4$—3-COOC$_2$H$_5$ |
| 45 | 4,5,6-tri-CH$_3$ | —O— | —NH(CH$_2$CH$_2$O)$_2$H |
| 46 | 4,5,6-tri-CH$_3$ | —O— | —NH(CH$_2$)$_6$COOH |
| 47 | 4,5,6-tri-CH$_3$ | —O— | —NHC$_6$H$_4$—4-CH$_2$OH |
| 48 | H | —O— | —NHC$_6$H$_4$—4-OCH$_2$CH$_2$OH |
| 49 | H | —O— | —NHC$_6$H$_4$—3-CH$_2$OH |
| 50 | H | —O— | —NHC(CH$_3$)$_2$CH$_2$OH |
| 51 | H | —O— | —N(CH$_2$C$_6$H$_5$)CH$_2$CH$_2$OH |
| 52 | 5-OCH$_2$CH$_2$OH | —O— | —NH$_2$ |
| 53 | 5-OCH$_2$CH$_2$OH | —O— | —N(C$_2$H$_5$)$_2$ |
| 54 | 5-OCH$_2$CH$_2$OH | —O— | —NHC$_6$H$_5$ |
| 55 | 5-CH$_2$CH$_2$OH | —O— | —N(CH$_3$)C$_6$H$_5$ |
| 56 | 5-OCH$_2$CH$_2$OH | —O— | —N(CH$_2$CH$_2$OCH$_3$)$_2$ |
| 57 | 5-OCH$_2$CH$_2$OH | —O— | —NHCH$_2$CH═CH$_2$ |
| 58 | 5,6-di-CH$_3$ | —O— | —NHC$_6$H$_4$—4-SCH$_2$CH$_2$OH |
| 59 | 5,6-di-CH$_3$ | —O— | —NHC$_6$H$_4$—4-CH$_2$COOH |
| 60 | 5,6-di-CH$_3$ | —O— | —NHC$_6$H$_4$—4-CH$_2$CH$_2$COOC$_2$H$_5$ |
| 61 | 6-NHCOC$_6$H$_4$—3-CF$_3$ | —O— | —N(CH$_2$CH$_2$OH)C$_6$H$_4$—4-OCH$_3$ |
| 62 | 5-CH$_3$ | —O— | —N(CH$_2$CH$_2$CH$_2$OH)C$_6$H$_4$—4-CH$_3$ |
| 63 | H | —S— | —OH |
| 64 | H | —S— | —Cl |
| 65 | H | —S— | —OCH$_2$CH$_2$OH |
| 66 | H | —S— | —OCH$_2$CH$_2$OCH$_3$ |
| 67 | H | —S— | —OCH$_2$C$_6$H$_{10}$—4-CH$_2$OH |
| 68 | H | —S— | —OCH$_2$CH(CH$_3$)$_2$ |
| 69 | H | —S— | —OCH$_2$CH$_2$Cl |
| 70 | H | —S— | —NHCH$_2$CH$_2$OH |
| 71 | H | —S— | —NHCH$_2$C$_6$H$_{10}$—4-CH$_2$OH |
| 72 | H | —S— | —N(CH$_2$CH$_2$OH)$_2$ |
| 73 | H | —S— | —NHCH$_2$CH(OH)CH$_2$OH |
| 74 | H | —S— | —NHC(CH$_3$)$_2$CH$_2$OH |
| 75 | H | —S— | —N(CH$_2$CH$_2$OOCCH$_3$)$_2$ |

-continued

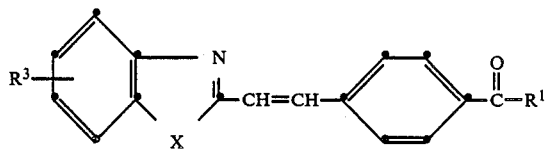

| Ex. | R³ | X | R¹ |
|---|---|---|---|
| 76 | H | —S— | —N(C$_6$H$_5$)CH$_2$CH$_2$OH |
| 77 | H | —S— | —N(C$_6$H$_{11}$)(CH$_2$)$_3$OH |
| 78 | H | —S— | —N(C$_6$H$_4$—4-CH$_3$)CH$_2$CH(OH)CH$_3$ |
| 79 | H | —S— | —N(C$_6$H$_4$—4-OCH$_3$)CH$_2$CH(OH)C$_6$H$_5$ |
| 80 | H | —S— | —NHC$_6$H$_4$—4-CH$_2$CH$_2$OH |
| 81 | H | —S— | —NHC$_6$H$_4$—4-OCH$_2$CH$_2$OH |
| 82 | H | —S— | —NHC$_6$H$_4$—3-CH$_2$OH |
| 83 | H | —S— | —N(CH$_2$C$_6$H$_5$)C$_6$H$_4$—3-COOC$_2$H$_5$ |
| 84 | H | —S— | —N(CH$_2$CH$_2$OC$_6$H$_5$)CH$_2$CH$_2$COOH |
| 85 | H | —S— | —N(CH$_2$CH$_2$OH)C$_6$H$_4$—3-Cl |
| 86 | H | —S— | —N(CH$_2$CH$_2$OH)C$_6$H$_4$—3-CF$_3$ |
| 87 | H | —S— | —N(CH$_2$CH$_2$OC$_2$H$_5$)CH$_2$C$_6$H$_4$—4-CH$_2$OH |
| 88 | H | —S— | —N(CH$_2$CH$_2$CN)C$_6$H$_4$—4-CH$_2$CH$_2$OH |
| 89 | H | —S— | —N(CH$_2$C$_6$H$_{11}$)(CH$_2$)$_4$OH |
| 90 | H | —S— | —NHCH$_2$C$_6$H$_4$—4-COOCH$_3$ |
| 91 | H | —S— | —NH(CH$_2$)$_5$COOH |
| 92 | H | —S— | —N(CH$_3$)CH$_2$CH$_2$OCH$_2$OH$_2$OH |
| 93 | H | —S— | —OCH$_2$CH=CH$_2$ |
| 94 | 5-CH$_3$ | —S— | —OH |
| 95 | 6-CH$_3$ | —S— | —OCH$_3$ |
| 96 | 4-CH$_3$ | —S— | —OC$_2$H$_5$ |
| 97 | 6,7-di-CH$_3$ | —S— | —OCH$_2$C$_6$H$_5$ |
| 98 | 6-C$_6$H$_5$ | —S— | —OH |
| 99 | 5,6-di-Cl | —S— | —OCH$_2$CH$_2$OC$_6$H$_5$ |
| 100 | 6-Br | —S— | —OCH$_2$C=CHCH=CHO |
| 101 | 5-OCH$_3$ | —S— | —OH |
| 102 | 6-OCH$_3$ | —S— | —OCH$_2$CH$_2$SCH$_2$CH$_2$OH |
| 103 | 6-C$_5$H$_{11}$ | —S— | —OH |
| 104 | 6-C$_6$H$_5$ | —S— | —OCH$_2$CH$_2$CN |
| 105 | 6-OC$_6$H$_4$—4-COOH | —S— | —OH |
| 106 | 6-NH$_2$ | —S— | —OH |
| 107 | 6-NHCOCH$_3$ | —S— | —OCH$_3$ |
| 108 | 6-NHCOC$_6$H$_5$ | —S— | —OCH$_3$ |
| 109 | 6-NHCOC$_6$H$_4$—4-Cl | —S— | —OCH$_2$CH(OOCCH$_3$)CH$_2$OOCCH$_3$ |
| 110 | 6-NHCOC$_6$H$_4$—4-OCH$_3$ | —S— | —OCH$_2$CH$_2$OOCNHCH$_3$ |
| 111 | 6-NHSO$_2$C$_6$H$_4$—3-COOCH$_3$ | —S— | —OCH$_2$CH$_2$OOCNHC$_6$H$_5$ |
| 112 | 6-NHCONHC$_2$H$_5$ | —S— | —OCH$_2$CH$_2$OOCOC$_2$H$_5$ |
| 113 | 4-CH$_2$CH$_2$OH | —S— | —NH$_2$ |
| 114 | 4-CH$_2$CH$_2$OH | —S— | —N(CH$_3$)$_2$ |
| 115 | 4-CH$_2$CH$_2$OH | —S— | —N(CH$_3$)C$_6$H$_5$ |
| 116 | 6-OCH$_2$CH$_2$OH | —S— | —NHC$_6$H$_5$ |
| 117 | 6-OCH$_2$CH$_2$OH | —S— | —NHC$_6$H$_{11}$ |
| 118 | 6-CH$_2$CH$_2$OH | —S— | —NHCH$_2$C$_6$H$_{10}$—4-CH$_2$OH |
| 119 | 6-CH$_2$CH$_2$OOCCH$_3$ | —S— | —OCH$_3$ |
| 120 | H | —NH— | —OH |
| 121 | H | —N(CH$_3$)— | —OCH$_3$ |
| 122 | H | —N(C$_2$H$_5$)— | —OCH$_3$ |
| 123 | H | —N(CH$_2$CH$_2$CN)— | —OCH$_3$ |
| 124 | H | —N—[(CH$_2$)$_3$OCH$_3$]— | —OCH$_3$ |
| 125 | H | —N(C$_6$H$_5$)— | —OCH$_3$ |
| 126 | H | —N(C$_6$H$_{11}$)— | —OCH$_3$ |
| 127 | H | —N(CH$_2$C$_6$H$_{11}$)— | —OCH$_3$ |
| 128 | H | —N(CH$_2$CH$_2$OH)— | —OCH$_2$CH$_2$OH |
| 129 | H | —N(CH$_2$CH$_2$OOCCH$_3$)— | —OCH$_2$CH$_2$OC$_2$H$_5$ |
| 130 | H | —N(CH$_2$CH$_2$OH)— | —NHCH$_2$CH$_2$OH |
| 131 | H | —NH— | —NHCH$_2$CH(OH)CH$_2$OH |
| 132 | H | —N(CH$_2$CH$_2$OH)— | —NH$_2$ |
| 133 | H | —N(C$_2$H$_5$)— | —N(CH$_3$)CH$_2$CH$_2$OH |
| 134 | H | —NH— | —N(C$_6$H$_5$)CH$_2$CH$_2$OH |
| 135 | H | —NH— | —N(CH$_2$CH$_2$OOCCH$_3$)$_2$ |
| 136 | H | —NH— | —N(C$_6$H$_{11}$)CH$_2$CH$_2$OH |
| 137 | H | —NH— | —N(C$_6$H$_4$—4-CH$_3$)CH$_2$CH$_2$OH |
| 138 | H | —NH— | —N(C$_6$H$_4$—4-OCH$_3$)CH$_2$CH$_2$OH |
| 139 | H | —NH— | —NHCH$_2$C$_6$H$_{10}$—4-CH$_2$OH |
| 140 | H | —NH— | —NHCH$_2$CH$_2$COOH |
| 141 | H | —NH— | —NH(CH$_2$CH$_2$O)$_2$H |
| 142 | H | —NH— | —NHC(CH$_3$)$_2$CH$_2$OH |
| 143 | H | —NH— | —NHCH$_2$CH$_2$OOCOC$_2$H$_5$ |
| 144 | H | —NH— | —NHCH$_2$CH$_2$OOCNHC$_2$H$_5$ |

-continued

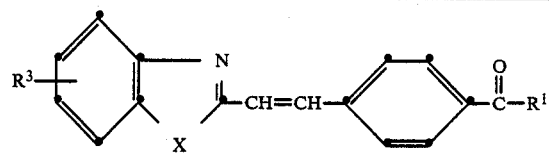

| Ex. | R³ | X | R¹ |
|---|---|---|---|
| 145 | H | —NH— | —NHCH₂C₆H₄—4-COOCH₃ |
| 146 | H | —NH— | —NHC₆H₄—4-CH₂CH₂OH |
| 147 | H | —NH— | —NHC₆H₄—4-OCH₂CH₂OH |
| 148 | H | —NH— | —NHC₆H₄—3-CH₂OH |
| 149 | H | —NH— | —NH(CH₂)₄COOH |
| 150 | H | —NH— | —NHCH₂CH₂OC₆H₄—4-COOCH₃ |
| 151 | 6-CH₃ | —NH— | —OCH₃ |
| 152 | 6-Cl | —NH— | —OCH₃ |
| 153 | 5,6-di-CH₃ | —NH— | —OH |
| 154 | 6-OCH₃ | —NH— | —OC₂H₅ |
| 155 | 5-Br | —NH— | —OCH₂C₆H₅ |
| 156 | 6-NHCOC₆H₅ | —NH— | —OCH₂CH₂OC₆H₅ |
| 157 | 6-NHSO₂C₆H₄—2-COOCH₃ | —NH— | —OCH₂CH₂C₆H₅ |
| 158 | 6-NHSO₂CH₃ | —NH— | —OCH₂CH=CH₂ |
| 159 | H | —NH— | —OCH₂C=CHCH=CHO |
| 160 | H | —NH— | —OCH₂CH₂CN |
| 161 | H | —NH— | —OCH₂CH₂SCH₂CH₂OH |
| 162 | H | —NH— | —OC₆H₅ |
| 163 | H | —NH— | —OC₆H₁₁ |
| 164 | H | —NH— | —OCH₂CH₂Cl |
| 165 | H | —NH— | —NHC₆H₂—3,5-di-CH₂OH—4-CH₃ |
| 166 | H | —NH— | —NHC₆H₄—3-CH(OH)CH₃ |
| 167 | H | —NH— | —NHC₆H₄—4-CH₂COOH |
| 168 | H | —NH— | —NHC₆H₄—4-SCH₂CH₂OH |
| 169 | H | —NH— | —N(CH₂C₆H₅)CH₂CH(OH)CH₃ |
| 170 | H | —NH— | —Cl |

EXAMPLE 171

The following materials are placed in a 500-mL, three-necked, round-bottom flask:

97 g (0.5 mol) dimethyl terephthalate
62 g (1.0 mol) ethylene glycol
0.00192 g Ti from a n-butanol solution of acetyl-triisopropyl titanate
0.0053 g Mn from an ethylene glycol solution of manganese acetate
0.0345 g antimony trioxide
0.0072 g Co from an ethylene glycol solution of cobaltous acetate The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 mL of an ethylene glycol slurry of a mixed phosphorus ester composition (Zonyl A) which contains 0.012 g phosphorus is added. The temperature of the bath is increased to 230° C. At 230° C., methyl 4-[2-(5,6-dimethyl-2-benzoxazolyl)vinyl]benzoate (0.0384 g) is added to the flask. Five minutes after this addition, a vacuum with a slow stream of nitrogen bleeding in the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.53 measured in a 60/40 ratio by weight of phenol/tetrachloroethane at a concentration of 0.5 g per 100 mL. An amorphous 13 mil thick film molded from this polymer to stimulate the sidewall of a container transmits less than 10% light from 250 to 388 nm whereas a 13 mil film prepared from a like polyester without the copolymerized absorber transmits greater than 10% light at all wavelengths above 320 nm.

EXAMPLE 172

Example 171 is repeated using 4-[2-(4,5,6-trimethyl(2-benzoxazolyl)vinyl]benzoic acid (0.0384 g) instead of the styrylbenzoxazole compound used in Example 171. The resulting polymer has an inherent viscosity of 0.52 measured in a 60/40 ratio by weight of phenol/tetrachloroethane at a concentration of 0.5 g per 100 mL. An amorphous 13 mil thick film molded from this polymer to simulate the sidewall of a container transmits less than 10% light from 250 to 392 nm whereas a 13 mil film prepared from a like polyester without the copolymerized absorber transmits greater than 10% light at all wavelengths above 320 nm.

The inherent viscosities (I.V. of the copolyesters described herein are determined according to ASTM D2857-70 procedure in a Wagner Viscometer of Lab Glass Inc., of Vineland, N.J., having a ½ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$\{\eta\} 25° C. = \frac{\ln \frac{t_s}{t_o}}{C}$$
$$0.50\%$$

where:
- $\{\eta\}$ = Inherent viscosity at 25° C. at a polymer concentration of 0.5 g/100 mL of solvent;
- ln = Natural logarithm;
- $t_s$ = Sample flow time;
- $t_o$ = Solvent-blank flow time; and
- C = Concentration of polymer in grams per 100 mL of solvent = 0.50.

The nonextractabilities of the methine residues described herein are determined as follows:

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 mL solvent/100 in.² surface area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours and after 30 days.

3. Heptane. The samples at room temperature are added to solvent at room temperature and heated at 150° F. for two hours. Part of the samples are cooled to room temperature and analyzed spectrophotometrically and the remainder are allowed to age at 120° F. for 30 days before analysis.

Any suitable analytical technique and apparatus may be employed to determine the amount of methine residue extracted from the polymer.

The invention has been described in detail with particular reference to preferred embodiments thereof, but it will be understood that variations and modifications can be effected within the spirit and scope of the invention.

We claim:

1. A composition comprising a molding grade, linear polyester wherein the polyester acid moiety is comprised of at least about 50 mol % terephthalic or 2,6-naphthalenedicarboxylic acid residue, and the glycol moiety at least 50 mol % ethylene glycol or 1,4-cyclohexanedimethanol residue having reacted or copolymerized therein about 2 to about 1500 ppm the residue of a styrylbenzazole compound or mixture of styrylbenzazole compounds having the formula:

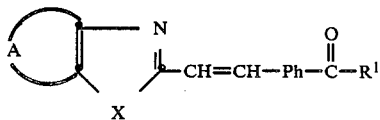

wherein
A is the residue of a benzene ring of a benzoxazole, benzothiazole or benzimidazole radical;
X is —O—, —S—, or —N(R²)—;
Ph is a phenylene radical; and
R¹ is halogen or —Y—R² wherein
Y is —O— or —N(R²)—; and
each R² is hydrogen, alkenyl or an unsubstituted or substituted alkyl, cycloalkyl or aryl radical.

2. A composition according to claim 1 wherein the polyester has reacted therein a total of about 200 to 800 ppm of the styrylbenzazole compound or mixture of styrylbenzazole compounds.

3. The composition of claim 1 wherein the styrylbenzazole compound has the formula:

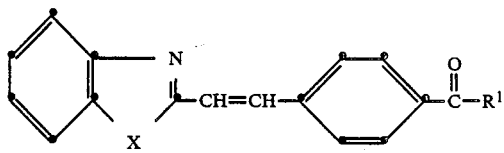

wherein
X is —O—, —S—, or —NH—; and
R¹ is hydroxy, alkoxy, hydroxyalkylamine or di(hydroxyalkyl)amine.

4. The composition of claim 2 wherein the styrylbenzazole compound has the formula:

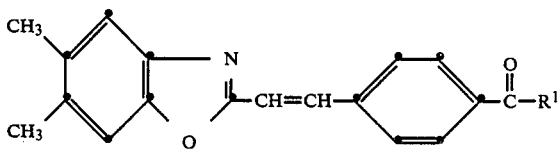

wherein R¹ is lower alkoxy, hydroxy or chloro.

5. The composition of claim 2 wherein the styrylbenzazole compound has the formula:

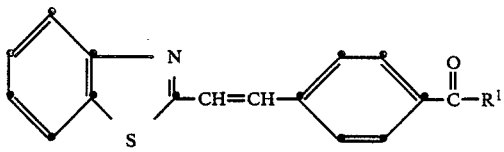

wherein R¹ is lower alkoxy, hydroxy or chloro.

6. The composition of claim 2 wherein the styrylbenzazole compound has the formula:

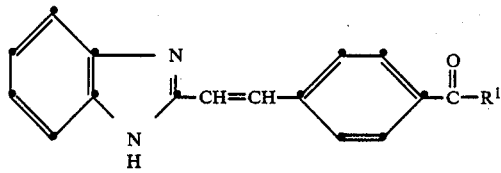
wherein $R^1$ is lower alkoxy, hydroxy or chloro.
7. The composition of any of the claims 1 through 3 wherein the polyester is comprised of from about 75 to 100 mol % terephthalic acid residue and from about 75 to 100 mol % ethylene glycol residue.
8. A container formed from the composition of claim 1.
9. A container formed from the composition of claim 3.
* * * * *